United States Patent [19]

Laidig

[11] Patent Number: 4,489,961
[45] Date of Patent: Dec. 25, 1984

[54] TERMINAL FOR FLEXIBLE TUBE
[75] Inventor: Manfred R. Laidig, Whippany, N.J.
[73] Assignee: The Singer Company, Stamford, Conn.
[21] Appl. No.: 485,761
[22] Filed: Apr. 18, 1983
[51] Int. Cl.³ ............................................. F16L 55/00
[52] U.S. Cl. ...................................... 285/116; 285/8; 285/174; 285/179; 285/242; 285/345; 285/423
[58] Field of Search ............... 285/174, 115, 116, 242, 285/345, 332, 179, 8, 423

[56] References Cited
U.S. PATENT DOCUMENTS

| | | |
|---|---|---|
| 2,304,114 | 12/1942 | Moore .......................................... 285/8 |
| 2,525,662 | 10/1950 | Freeman ........................... 285/115 X |
| 3,225,435 | 12/1965 | Anthon . |
| 3,603,620 | 9/1971 | Nokoto . |
| 3,711,130 | 1/1973 | Betzler . |
| 3,784,236 | 1/1974 | Slocum ............................ 285/115 X |
| 3,791,406 | 2/1974 | Philipps . |
| 3,817,562 | 6/1974 | Cook et al. . |
| 3,858,913 | 1/1975 | Gallagher . |
| 4,343,498 | 8/1982 | Campanini ........................ 285/179 X |

Primary Examiner—Richard J. Scanlan, Jr.
Attorney, Agent, or Firm—William V. Ebs; Robert E. Smith; Edward L. Bell

[57] ABSTRACT

Flexible tubing for use in connecting a pneumatic foot controller to a sewing machine is provided at one end with a detachable plastic connector including a tight fitting tube supporting sleeve and a serrated end fitting which is locked in place in the tubing with the sleeve.

2 Claims, 4 Drawing Figures

TERMINAL FOR FLEXIBLE TUBE

BACKGROUND OF THE INVENTION

1. Field of the Invention

The invention is directed to a terminal for use in connecting flexible tubing to mechanism which is to receive operating signals through the tubing.

2. Description of the Prior Art

A speed control system for the electric motor of a sewing machine may include a pneumatic foot controller, a pneumatic to electric transducer to which signals are transmitted according to the operation of the controller through flexible tubing connecting the controller with the transducer, and circuitry for controlling the electric motor according to the operation of the transducer. The flexible tubing may be permanently attached to the foot controller, but should be readily attachable to, and detachable from, the transducer at the machine. It is known to provide the flexible tubing in such a system with a terminal facilitating attachment of the tubing to the transducer and detachment therefrom, and to have the terminal molded in place at the end of the tubing so as to become an integral part thereof. A difficulty with such a terminal is that it cannot be disassembled from the tubing and reused if the tubing is damaged. The tubing along with the terminal has to be discarded and replaced.

It is a prime object of the present invention to provide flexible tubing with a connector terminal which can be disassembled from the tubing and reused with a replacement tube.

It is another object of the invention to provide flexible tubing with a connector terminal as described, including a tube supporting sleeve which an operator can grip and use to move the terminal as required to connect or disconnect it from a rigid tubular member.

Other objects and advantages of the invention will become apparent during a reading of the specification taken in connection with the accompanying drawings.

SUMMARY OF THE INVENTION

A multipart connector terminal including a flexible sleeve and end fitting is provided for a flexible tube. The sleeve is tightly fitted over and provides support to an end portion of the tube. The end fitting includes a serrated end portion which is inserted into a portion of the sleeve supported length of the tube and is locked to the tube by the sleeve. The end fitting is formed with a through opening which is tapered in an opposite end portion of the fitting from the serrated portion. A length of the sleeve other than the part over the end portion of the tube which receives the serrated male end portion of the fitting is formed to render such length more flexible than said other part and to provide a hand grip.

DESCRIPTION OF THE INVENTION

Figure 1:
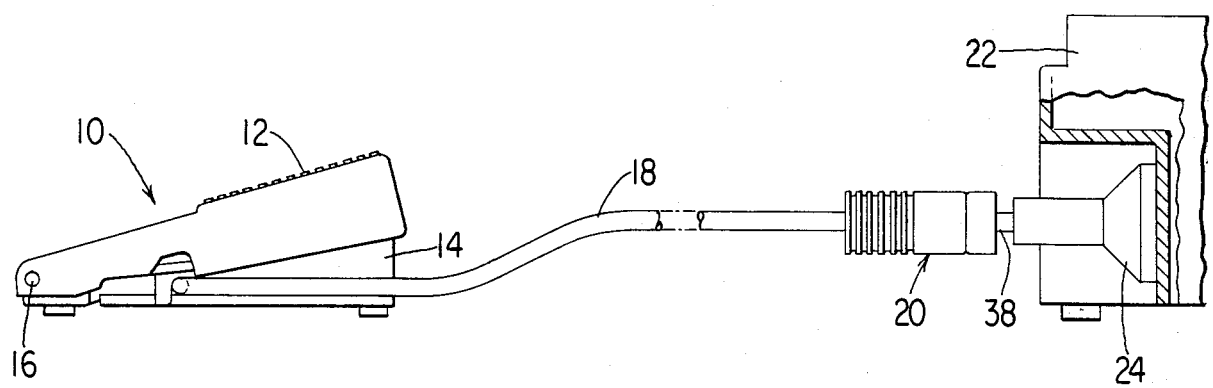
FIG. 1 is a somewhat diagramatic view showing the flexible hose of a pneumatic foot controller connected to a transducer at a sewing machine with a connector terminal according to the invention.

Referring to FIG. 1 of the drawings, reference character 10 designates a pneumatic foot controller for use in controlling the speed of a sewing machine motor. The controller which is of the kind disclosed, for example, in the copending U.S. patent application of Jack Brown for "Vented Pneumatic Foot Controller", Ser. No. 320,393, filed Nov. 12, 1981, includes a pedal 12 pivotally mounted on a base 14 at 16 for controlling air pressure in a collapsible bulb (not shown) within the controller. A flexible plastic pneumatic tube 18 fixedly associated with the foot controller is provided with an end connector terminal 20 according to the invention for use in connecting the tube at a sewing machine 22 to a transducer 24 with which pressure signals can be converted to electric motor speed control signals.

Terminal 20 is a multipart device (see FIGS. 2 and 3), including a flexible sleeve 26 which is formed to have a tight fit with and provide support for tube 18. The terminal also includes an end fitting 28 with a through opening 30. Fitting 28 has a serrated male end portion 32 and an opposite end portion 34. Opening 30 is tapered in end portion 34, as shown at 36, to facilitate attachment of the end fitting 28 to rigid pipe end 38 on transducer 24. End portion 34 of fitting 28 is formed about the tapered portion of the opening 30 with blind holes 40 to render this portion of the opening expandable by the pipe end 38. The sleeve 26 and end fitting 28 are of an elastomeric material such as vinyl plastic, and as such can be readily molded to the shapes required for these parts.

Sleeve 26 extends in tight fitting, supporting engagement with an end portion of tube 18, and the serrated male end portion 32 of fitting 28 extends into a portion of the sleeve engaged length of the tube which is thereby held securely relative to both the fitting and the sleeve. A length of the sleeve, other than the part in engagement with that portion of the tube wherein the male end portion 32 of the fitting 28 extends, is preferably formed to render such length more flexible than the other part and provide a hand grip for an operator. The desired result is readily achieved by having the said length formed with reduced cross-sectional ringed portions 42 at spaced intervals as shown. With a terminal as described at the end of tube 18, it is only necessary to grasp the terminal at the hand grip and push fitting 28 onto pipe end 38 to connect tube 18 with transducer 24.

Terminal 20 has the advantage of being separable from tube 18 and reusable with another length of tube in the event the original tube should rupture or be otherwise damaged. The terminal may be separated from tube 18 by pulling sleeve 26 back from fitting 28 beyond that postion of the tube which is engaged by the male serrated portion 32 of the fitting, and then pulling on the fitting to extract portion 32 from the tube. The terminal is reassembled on a new length of tube by forcibly inserting fitting portion 32 into the tube after the sleeve 26 has been threaded onto the sleeve, and then sliding sleeve 26 into a position wherein it extends over that part of the tube which is engaged by the fitting portion 32.

Figures 2, 3:
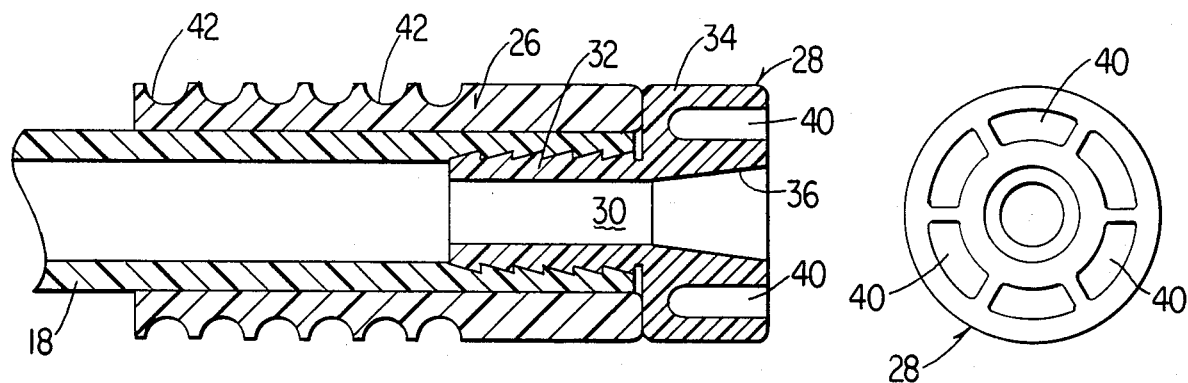
FIG. 2 is a longitudinal, vertical, sectional view taken through the connector terminal.
FIG. 3 is an end view of the connector terminal.
Figure 4:
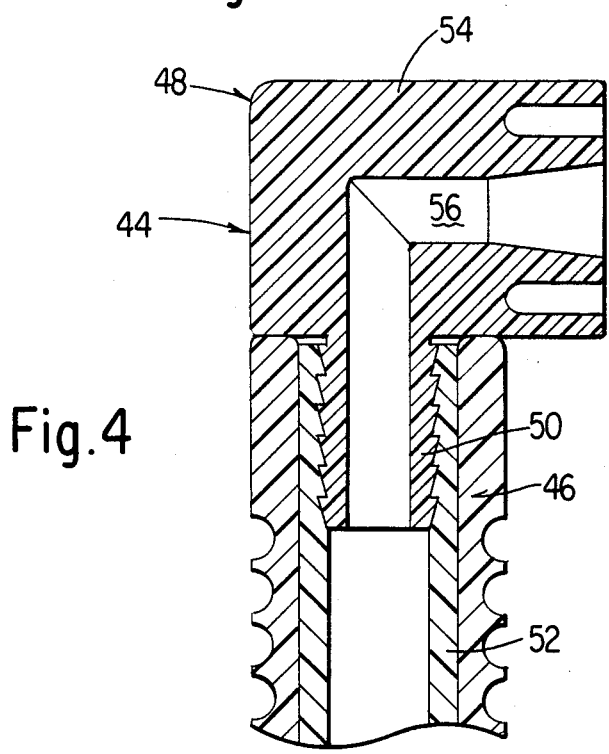
FIG. 4 is a vertical, sectional view through a modified connector terminal.

Referring to FIG. 4, there may be seen a terminal 44 which is generally like the terminal 20 already described, in that such terminal 44 includes a flexible sleeve 46 and a fitting 48 with a serrated male portion 50 which connects with a flexible tube 52 in the manner described for terminal 20. However, the fitting 48 in terminal 20 is formed with a portion 54 extending at a right angle with respect to the serrated male portion and with a right angled through opening 56. Such fitting 48 permits the terminal 44 to be connected as to a sewing machine in a cabinet wherein space limitations would prevent the use of a straight line terminal 20 as shown in FIGS. 1 and 2.

It is to be understood that the present disclosure relates to a preferred embodiment of the invention which is for purposes of illustration only, and is not to be construed as a limitation of the invention. Numerous alterations and modifications of the structures herein disclosed will suggest themselves to those skilled in the art, and all such modifications and alterations which do not depart from the spirit and scope of the invention are intended to be included within the scope of the appended claims.

I claim:

1. A multipart terminal for a flexible tube, said terminal including a flexible molded plastic sleeve in tight fitting supporting engagement with an end portion of the tube, the terminal also including a molded plastic end fitting with a male serrated end portion extending into a portion of the sleeve engaged length of the tube which is thereby held securely relative to both the fitting and sleeve, said fitting being formed with a through opening that is tapered in an opposite end portion of the fitting from the serrated portion, and a length of the sleeve, other than the part in engagement with that portion of the tube wherein the serrated male end portion of the fitting extends, being formed to render such length more flexible than the said other part.

2. A multipart terminal according to claim 1 wherein said length of the sleeve, other than the part in engagement with that portion of the tube wherein the serrated male end portion of the fitting extends, is formed with reduced cross-sectional ringed portions to render such length more flexible than the said other part.

* * * * *